March 11, 1930.    A. CALLSEN    1,750,259
ELECTRICAL MEASURING INSTRUMENT
Filed Aug. 9, 1927
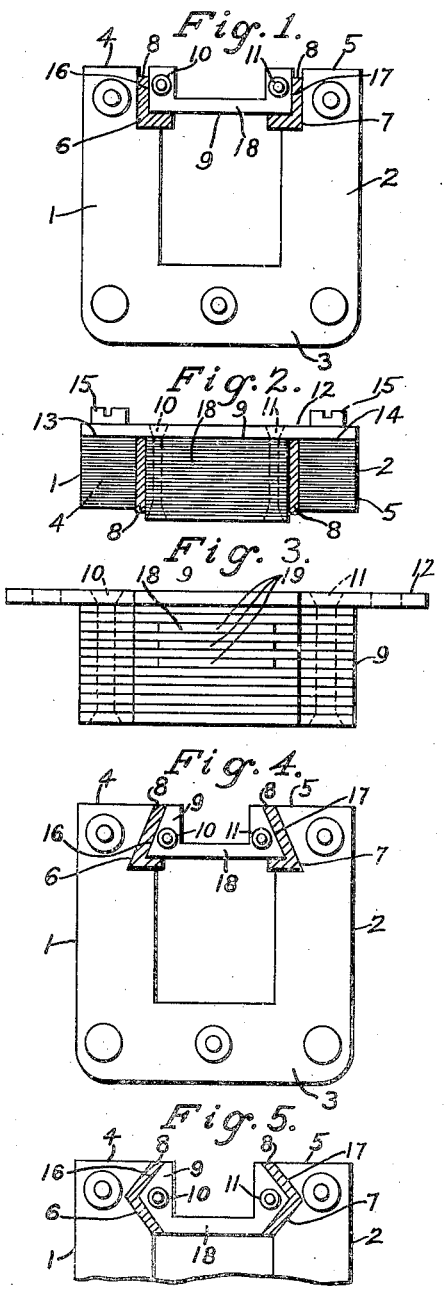
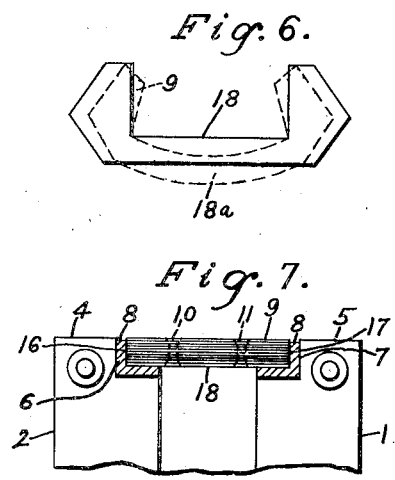
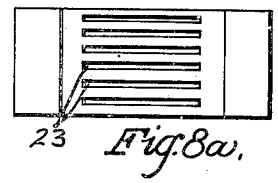
INVENTOR
Albert Callsen
B. R. King
BY
Wesley T. Carr
ATTORNEY Patented Mar. 11, 1930

1,750,259

UNITED STATES PATENT OFFICE

ALBERT CALLSEN, OF NUREMBERG, GERMANY, ASSIGNOR TO WESTINGHOUSE ELECTRIC & MANUFACTURING COMPANY, A CORPORATION OF PENNSYLVANIA

ELECTRICAL MEASURING INSTRUMENT

Application filed August 9, 1927, Serial No. 211,731, and in Germany December 9, 1926.

My invention relates to electrical measuring instruments or meters of the type involving the interaction of alternating fluxes for exerting, on a member, a turning torque that is substantially proportional to the product of two electrical quantities, such as current and electromotive force.

My invention resides in apparatus for effecting phase displacement between the current energizing the series core structure of an induction meter and the flux generated thereby, upon an increase in the saturation of a shunt member designed to improve the overload operation of the induction meter and positioned in the series core structure of the meter. It is characteristic of my apparatus for this purpose that it is extremely small and compact and may be efficiently and cheaply embodied in suitable apparatus.

It is further characteristic of my invention that, under certain conditions, the phase displacement between the load current and the flux generated thereby, upon an increase in saturation in the bridging member, decreases with the increase in load. Such decrease in the phase angle between the current and the flux generated thereby, makes possible a compensation for the positive error caused by existing action of the light-load displacement, when the meter is subjected to loads having relatively small inductive reactance.

My invention resides in the apparatus hereinafter described and claimed, the foregoing and further characteristics of my invention being determinable from the following description.

For an understanding of my invention and description of some of the forms my apparatus may take, reference is to be had to the accompanying drawings in which:

Figure 1 is a view, in elevation, of that form of my invention employing a laminated shunt and its relation to a series core of an induction meter.

Fig. 2 is a view, in plan, of the top of the apparatus shown in Fig. 1,

Fig. 3 is an enlarged view, similar to Fig. 2, of a modification,

Fig. 4 is an elevational view, similar to Fig. 1, of a modified means for securing the shunt member to the series core, Fig. 5 is a view, in side elevation, of the upper portion of a series core showing a further modification of a means for securing the shunt to the series core, Fig. 6 is a diagrammatic view showing how the shunt member, shown in Fig. 5, may be so bent as to be inserted in the series core, Fig. 7 is a view, similar to Fig. 5, of a means for mounting the laminations of the shunt in the plane parallel to the faces of the poles of the series core, Fig. 8 and Fig. 8a are views in side elevation and plan, respectively, of a shunt comprising a single sheet-metal element having laminations simulated by parallel slots, and Fig. 9 is a view, in side elevation, of a further modification in which the laminations of the shunt are secured to metallic members that are, in turn, secured to the series core.

Figs. 1 and 2 illustrate the laminated iron core of a series magnet having a laminated bridge located between the poles. The inner surfaces of the legs 1 and 2 of a core 3 are provided with shoulder portions 6 and 7 near the pole faces 4 and 5. A laminated bridging member, or shunt, 9 extends between the shoulder portions 6 and 7, inserts of non-magnetic material 8 being located between the two members. The bridging member 9 is made up of laminations of substantially U-shape having the intermediate portion thereof of less cross sectional area than that of the series core, and enlarged end portions adapted to rest upon the shoulders 6 and 7. The laminations of the shunt 9 are held together by tubular rivets 10 and 11 that are located in the legs of the bridging member, the rivets serving also to secure the bridging member 9 to a bar 12 of non-magnetic material which is secured to the side faces 13 and 14 of the legs 1 and 2. Screws 15 hold the strip 12 against the sides of the magnet.

The faces or surfaces 16 and 17, through which the flux from the magnet poles enters the bridging members, are located at right angles to the pole faces 4 and 5. The enlarged end portions of the bridging member 9 increase the area of the inner sides of pole faces 4 and 5. It is, therefore, possible to make the legs 1 and 2 somewhat narrower, whereby an increased winding space between the legs is obtainable.

Increased saturation in the intermediate part 18 of the shunt member 9 may be obtained by cutting away individual laminations 19, as shown in Fig. 3.

Referring to Figs. 4 and 5, the magnetic bridge is provided with ends of triangular form which are wedged between the ends of the magnet. Clamping of the laminated wedges may be effected, in the manner illustrated in Fig. 6, by bending the intermediate portion 18a of the bridging member, and then straightening the same after insertion.

Figs. 7 and 8 show other forms of a magnetic bridge. The bridge illustrated in Fig. 7 consists of said laminations the plane of which extends parallel to that of the pole faces 4 and 5.

Fig. 9 shows the use of metal members 21 and 22 that are riveted to the laminations 20 in order to increase the area of the bridging member in engagement with the core.

The bridging member illustrated in Figs. 8 and 8a consists of a single sheet metal element, the laminations being simulated by parallel-extending slots 23.

While I consider a laminated overload shunt to be an essential feature of my invention for improving the characteristics of an induction meter, it is obvious that a similar result may be accomplished by other means, for example, by slotting a solid shunt, to reduce the eddy current losses and lagging flux incident to a solid shunt.

Various modifications may be made in my invention without departing from the spirit and scope thereof, and I desire therefore that only such limitations shall be placed thereon as are imposed by the prior art and appended claim.

I claim as my invention:

In an induction meter, the combination with a magnetic core of substantially U shape providing a pair of spaced pole pieces, of a magnetic shunt comprising an intermediate portion saturable at a predetermined flux value and enlarged end portions, and means for securing said shunt to said pole pieces whereby the enlarged end portions thereof increase the effective area of the faces of said pole pieces.

In testimony whereof, I have hereunto subscribed my name at Nuremberg, Germany, this 7 day of July, 1927.

ALBERT CALLSEN.